United States Patent
Bluschke et al.

(10) Patent No.: US 12,113,573 B2
(45) Date of Patent: Oct. 8, 2024

(54) POWER SUPPLY FOR DISTRIBUTED OPTICAL WIRELESS COMMUNICATION SYSTEM

(71) Applicant: SIGNIFY HOLDING B.V., Eindhoven (NL)

(72) Inventors: Andreas Felix Alfred Bluschke, Eindhoven (NL); Christian Jordan, Venlo (NL); Haimin Tao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 140 days.

(21) Appl. No.: 17/926,187

(22) PCT Filed: May 18, 2021

(86) PCT No.: PCT/EP2021/063065
§ 371 (c)(1),
(2) Date: Nov. 18, 2022

(87) PCT Pub. No.: WO2021/233868
PCT Pub. Date: Nov. 25, 2021

(65) Prior Publication Data
US 2023/0198616 A1    Jun. 22, 2023

(30) Foreign Application Priority Data
May 22, 2020   (EP) .................................... 20175986

(51) Int. Cl.
*H04B 10/112*   (2013.01)
*H04B 10/114*   (2013.01)
*H04B 10/116*   (2013.01)

(52) U.S. Cl.
CPC ..... *H04B 10/1129* (2013.01); *H04B 10/1149* (2013.01); *H04B 10/116* (2013.01)

(58) Field of Classification Search
None
See application file for complete search history.

(56) References Cited

U.S. PATENT DOCUMENTS

| 7,923,855 B2* | 4/2011 | Biegert | H04B 3/542 |
| | | | 398/171 |
| 7,995,920 B2* | 8/2011 | Wynman | H04Q 11/0067 |
| | | | 398/5 |
| 8,543,008 B2* | 9/2013 | Soto | H04B 10/27 |
| | | | 398/171 |

(Continued)

FOREIGN PATENT DOCUMENTS

| EP | 1956762 A1 | 8/2008 |
| EP | 2228961 A2 | 9/2010 |
| WO | 2014148774 A1 | 9/2014 |

*Primary Examiner* — Jai M Lee

(57) ABSTRACT

This invention relates to a power supply system for an optical wireless communication system where a modem (212) is connected to a plurality of transceivers (11). The underlying idea being that the transceivers (11) are powering the modem (212), rather than the modem (212) powering the transceivers (11). To achieve this, a power combiner is provided that can receive power from the transceivers (11). The transceivers (11) power down when no endpoint is detected and use a subset of emitters, in which case the modem (212) can also be switched to a lower power mode.

14 Claims, 4 Drawing Sheets

(56) References Cited

U.S. PATENT DOCUMENTS

| | | | | |
|---|---|---|---|---|
| 8,818,192 B1* | 8/2014 | Smith | ............... | H04B 10/808 |
| | | | | 398/171 |
| 9,351,187 B2 | 5/2016 | Trojer | | |
| 10,110,755 B2* | 10/2018 | Cooper | ............... | H04M 19/08 |
| 10,848,241 B2* | 11/2020 | Featherston | ..... | H04B 10/07955 |
| 10,855,373 B2* | 12/2020 | Linney | ............... | H04L 12/2869 |
| 2016/0121009 A1 | 5/2016 | Farr et al. | | |
| 2016/0309565 A1 | 10/2016 | Tran | | |
| 2018/0124235 A1* | 5/2018 | Kim | ............... | H04L 1/0006 |
| 2018/0331767 A1 | 11/2018 | Shurki et al. | | |

* cited by examiner

POWER SUPPLY FOR DISTRIBUTED OPTICAL WIRELESS COMMUNICATION SYSTEM

CROSS-REFERENCE TO PRIOR APPLICATIONS

This application is the U.S. National Phase application under 35 U.S.C. § 371 of International Application No. PCT/EP2021/063065, filed on MAY 18, 2021, which claims the benefit of European Patent Application No. 20175986.7, filed on MAY 22, 2020. These applications are hereby incorporated by reference herein.

FIELD OF THE INVENTION

The invention relates to the field of power supply for optical wireless communication networks, such as—but not limited to—LiFi networks, for use in various different applications for home, office, retail, hospitality and industry.

BACKGROUND OF THE INVENTION

United States patent application US 2018/0124235 A1 discloses an apparatus for reverse power feeding in wireline communication environments. The patent application discloses a distribution point device that on one hand communicates with a central office or optical line terminal over a wireline optical network and on another hand communicates over several wireline communication lines (e.g. a twisted pair copper wire) to respective customer premises equipment. The customer premises equipment reverse powering the distribution point.

Wireless optical networks, such as LiFi networks (named like WiFi networks), enable mobile user devices (called end points (EP) in the following) like laptops, tablets, smartphones or the like to connect wirelessly to the internet. WiFi achieves this using radio frequencies, but LiFi achieves this using the light spectrum which can enable unprecedented data transfer speed and bandwidth. Furthermore, it can be used in areas susceptible to electromagnetic interference. It's important to consider that wireless data is required for more than just our traditional connected devices—today televisions, speakers, headphones, printer's, virtual reality (VR) goggles and even refrigerators use wireless data to connect and perform essential communications. Radio frequency (RF) technology like WiFi is running out of spectrum to support this digital revolution and LiFi can help power the next generation of immersive connectivity.

Based on the modulations, the information in the coded light can be detected using any suitable light sensor. This can be a dedicated photocell (point detector), an array of photocells possibly with a lens, reflector, diffuser of phosphor converter, or a camera comprising an array of photocells (pixels) and a lens for forming an image on the array. E.g., the light sensor may be a dedicated photocell included in a dongle which plugs into the end point, or the sensor may be a general purpose (visible or infrared light) camera of the end point or an infrared detector initially designed for instance for 3D face recognition. Either way this may enable an application running on the end point to receive data via the light.

In wireless optical networks, a physical access device (e.g. transceiver) may typically be located at a luminaire and the logical access point may be connected to one or more physical access devices each located at one or more luminaires. A communication signal can be embedded in a light signal emitted by an illumination source of the physical access device, such as an everyday luminaire, e.g. room lighting or outdoor lighting, thus allowing use of the illumination from the luminaires as a carrier of information. The light thus comprises both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination. A physical access device (e.g. transceiver) may typically be located at a luminaire and the logical access point may be connected to one or more physical access devices each located at one or more luminaires. In many Illumination systems, a contiguous uniform light level is achieved by involving many luminaires and light sources in the same room that all emit light.

However, such optical wireless communication systems may involve high power consumption, which is not good for sustainability (energy cost, heating). Moreover, a high amount of work and/or costs is required for installing power supply systems for the modulator/demodulator units (i.e. modems) in conventional architectures.

SUMMARY OF THE INVENTION

It is an object of the present invention to provide a power supply architecture for an optical wireless communication system with distributed transceivers, by which power consumption and installation requirements can be reduced.

This object is achieved by an optical wireless communication system as claimed in claim 1.

According to a first aspect, an apparatus is provided for controlling power supply to a modem connected to a plurality of transceivers in an optical wireless communication system, the apparatus being configured to select at least one of the transceivers for reverse power supply to the modem and to establish a power supply connection between the selected transceiver and a power supply unit of the modem to supply power to the modem.

Accordingly, power for the modem is supplied in the reverse direction from the transceiver side, so that power lines to the modem from a mains power supply can be avoided and less power needs to be supplied to the modem. Thereby, power consumption and installation requirements can be reduced.

According to a first option of the first aspect, a transceiver with the highest available supply voltage may be selected among the plurality of transceivers for reverse power supply to the modem. This ensures that a less-loaded transceiver with highest supply voltage is used for reverse power supply.

According to a second option of the first aspect, which can be combined with the first option, power supply connections from the plurality of transceivers may be combined via at least one respective valve element at a common coupling element. Such a circuitry provides a simple hardwired solution for selecting the transceiver with the highest supply voltage.

According to a third option of the first aspect, which may be combined with the first or second option or with the first aspect, a transceiver may be in a standby mode with reduced power consumption, if the transceiver has not detected any signal from a transceiver circuit of an endpoint of the optical wireless communication system. Thereby, power consumption of the transceivers can be reduced as long as no potential communication target is detected.

According to a fourth option of the first aspect, which may be combined with any one of the first to third options or with the first aspect, power may be supplied to the modem in a time sequential manner, so that a duration of power supply is spread over the plurality of transceivers. This ensures that the total available power of all transceivers is exploited for the proposed reverse power supply.

According to a fifth option of the first aspect, the apparatus may be configured to be connectable as a separate device between the modem and the plurality of transceivers.

Preferably the optical wireless communication system in accordance with the first aspect includes a pluralirt of transceivers that are powered by one or more power sourcing equipment. The respective power sourcing equipment may for example be a power supply in or nearby the luminaires. Power sourcing equipment in a lighting context may come in various shapes forms or sizes. Such power sourcing equipment, may for example be a mains (AC/DC) converter or a Power over Ethernet (PoE) power supply connected to a luminaire. Optionally each luminaire comprises an AC/DC mains power supply which is used to power both the luminaire's illumination function as well as the optical wireless communication transceiver of a luminaire. Alternatively a mains power supply may be located remote from the luminaire, and/or may be a PoE power supply used to power one or more luminaires (and thereby also the co-located optical transceivers).

According to a second aspect, a modem is provided for generating output signals for multiple transceivers in an optical wireless communication system, wherein the modem comprises an apparatus according to the first aspect.

According to a first option of the second aspect, the modem may be configured to be installed at a ceiling of a building in which the optical wireless communication system is used. Thereby, installation requirements and power loss can be reduced since shorter power supply connections need to be routed from the transceivers to the modem only.

According to a second option of the second aspect, which can be combined with the first option, the modem may comprise a power combiner configured to receive power from the plurality of transceivers via respective wired power supply connections. Thus, the reverse power supply can be implemented by simply adding power connection lines to the existing data connection lines between the modem and the transceivers.

According to a third aspect, an optical wireless communication system is provided, which comprises a modem according to the third aspect, a plurality of transceivers, and at least one power sourcing equipment capable of powering at least one of the plurality of transceivers and the modem. Thereby, a power sourcing equipment with reduced power consumption can be provided, as the power is supplied in the reversed direction via the transceivers.

In this system the modem generates output signals for a plurality of optical transceivers in the optical wireless communication system. The plurality of optical transceivers each comprise an optical emitter and a light sensor for use in optical communication towards end points. The optical emitter is configured to emit an optical signal based on the output signal generated by the modem, which signal in turn may be received by an end point device when present.

Such an end point device, when present, will typically also include an end point device optical transceiver which allow the end point to perform optical communication with the optical transceiver associated with the modem.

According to a first option of the third aspect, the at least one power sourcing equipment may be configured to supply power to at least one luminaire of the optical wireless communication system. This provides the advantage that the power sourcing equipment of the luminaire(s) can be used for powering transceivers and the modem, so that installation requirements can be reduced.

According to a second option of the third aspect, which can be combined with the first option, the plurality of transceivers may be co-located with respective luminaires powered by the power sourcing equipment. Thereby, power supply connection lines can be kept short to reduce installation effort and power loss. Optionally, the co-located transceiver may be a separate optical wireless communication device, that is coupled to the luminaire using an extension/plug-in connector. Alternatively, the transceivers may be an integral part of the luminaire, whereby the transceiver's emitter(s) are dedicated light sources that are separate from the illumination light sources; for example, but not exclusively, when the downlink signal is in the infrared or ultraviolet spectrum. More alternatively still, when the transceiver is an integral part of the luminaire and the downlink signal is in the visible range; the illumination light source(s) could be dual-function light source(s); emitting illumination light having the optical wireless transmission signal modulated onto the emitted illumination light.

According to a third option of the third aspect, which can be combined with the first or second option, the plurality of transceivers may be configured to reduce their power consumption by using a subset of emitters when no transceiver device of an endpoint is detected. Thus, power consumption of the system can be adapted to the potential communication targets available and thereby reduced.

According to a fourth option of the third aspect, which can be combined with any one of the first to third options, a management channel may be provided between a transceiver device of an endpoint and the plurality of transceivers, wherein the transceivers are configured to communicate via the management channel by using a reduced number of emitters. Thereby, the transceivers are enabled to receive communication requests or beacons from available endpoint transceiver devices, while still saving power by using the reduced number of emitters. This feature capitalizes on the insight that on account of the lower bandwidth requirements of the management signals; the management channel may use a more robust modulation type, which in turn may be received even when emitted at a lower optical transmit power.

According to a fourth aspect, a method of controlling power supply to a modem connected to a plurality of transceivers in an optical wireless communication system is provided, the method comprising:
  selecting at least one of the transceivers for reverse power supply to the modem; and
  establishing a power supply connection between the selected transceiver and a power supply unit of the modem to supply power to the modem.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

These and other aspects of the invention will be apparent from and elucidated with reference to the embodiments described hereinafter.

DETAILED DESCRIPTION OF EMBODIMENTS

Various embodiments of the present invention are now described based on an optical wireless illumination and communication (LiFi) system with multi-transceiver access device. Although the present invention is particularly advantageous within the context of an illumination system, the invention is not limited thereto and may also be used within an optical wireless communication system that is not integrated within an illumination system.

Throughout the following, a luminaire as an access device is to be understood as any type of lighting unit or lighting fixture which comprises one or more light sources (including visible or non-visible (infrared (IR) or ultraviolet (UV)) light sources) for illumination and/or communication purposes and optionally other internal and/or external parts necessary for proper operation of the lighting, e.g., to distribute the light, to position and protect the light sources and ballast (where applicable), and to connect the luminaires to a power supply. Luminaires can be of the traditional type, such as a recessed or surface-mounted incandescent, fluorescent or other electric-discharge luminaires. Luminaires can also be of the non-traditional type, such as fiber optics with the light source at one location and the fiber core or "light pipe" at another.

It is further noted that when using optical wireless communication based on invisible parts of the light spectrum, such as infrared and/or or ultraviolet, a separate transceiver node may be used in the optical wireless communication system.

Conventional light source luminaires are rapidly being replaced by light emitting diode (LED) based lighting solutions. In LiFi systems, more advanced LED based luminaires are enabled to act as LiFi communications hub to add LiFi connectivity to lighting infrastructure. The underlying idea is that the illumination infrastructure is positioned in such a manner that it provides a line of sight from the luminaire to locations where people tend to reside. As a result, the illumination infrastructure is also well positioned to provide optical wireless communication that likewise requires line of sight.

According to various embodiments, power consumption of such LiFi system or other optical wireless communication systems is reduced, e.g., to improve sustainability.

Figure 1:
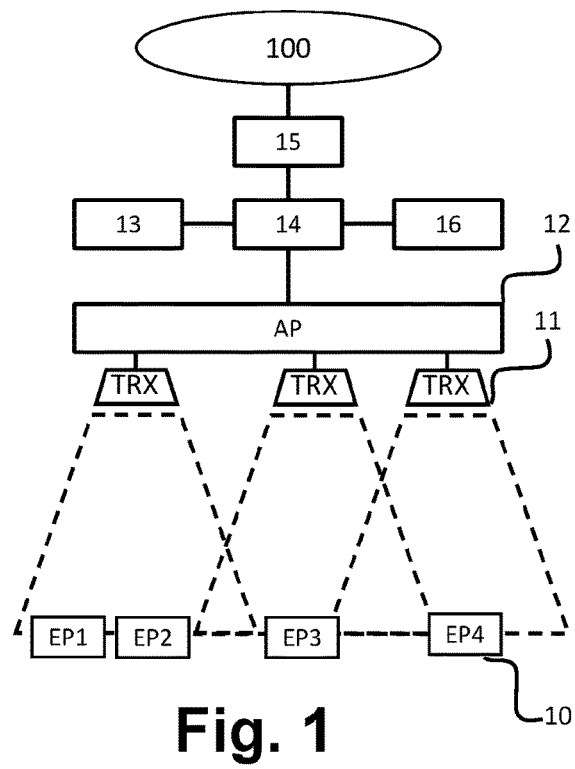
FIG. 1 shows schematically a block diagram of a LiFi architecture in which various embodiments can be implemented.

FIG. 1 shows schematically a block diagram of a LiFi network in which various embodiments can be implemented.

It is noted that—throughout the present disclosure—the structure and/or function of blocks with identical reference numbers that have been described before are not described again, unless an additional specific functionality is involved. Moreover, only those structural elements and functions are shown, which are useful to understand the embodiments. Other structural elements and functions are omitted for brevity reasons.

The LiFi network comprises at least one access point (AP) 12, e.g. luminaires of a lighting system, connected via a switch (e.g. an Ethernet switch) 14, whereby the AP 12 may control multiple transceivers (TRX) 11 (i.e. combined transmitters (optical emitters) and receivers (light sensors)) for optical communication towards end points (EP) EP1 to EP4 10, e.g., mobile user devices or other user devices. Respective light beams generated by the TRXs 11 and defining coverage areas on the plane(s) of the EPs 10 are indicated by the dashed trapezoids in FIG. 1.

The AP 12 may apply a time-slot schedule for communicating with EP(s) 10 in its coverage area.

A LiFi controller 13 configured to manage the LiFi network is connected to the switch 14 and can provide such coordination for supporting interference handling and handover when one of the EPs 10 moves into and out of overlapping coverage areas of different APs 12. The controller 13 is connected via the switch 14 to the AP 12. The switch 14 may be connected to a synchronization server 16 for synchronization management and to a router 15 for connecting to a backplane or backhaul network (e.g. Ethernet) 100.

Figure 2:
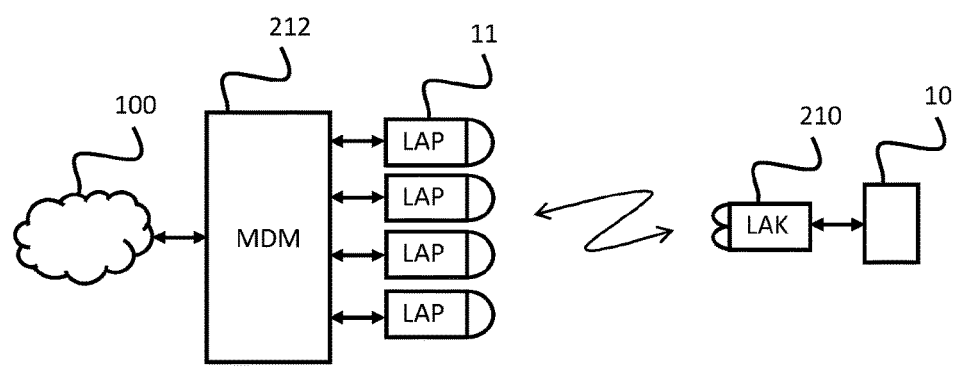
FIG. 2 shows schematically a block diagram of a modem based LiFi transmission system in which various embodiments can be implemented.

FIG. 2 shows schematically a block diagram of a LiFi transmission system with a LiFi modem (MDM) 212 (which may be comprised in the AP 12 of FIG. 1) connected to a plurality of TRXs 11, in which various embodiments can be implemented. The TRXs 11 (which may be called LiFi access points (LAPs)) provide optical wireless connection links to an EP 10 (e.g. a laptop, tablet, smartphone or other mobile device) via an EP transceiver device 210 (which may be called LiFi access key (LAK)) such a USB stick (dongle) with a transceiver, that can be plugged into the endpoint 10. The connections between the modem 212 and the TRXs 11 may be wired (e.g. copper-based and/or fiber-based).

The modem 212 may comprise a physical layer (PHY) access unit for providing access to the Internet via the backplane or backhaul network (e.g. Ethernet) 100, a baseband unit with a memory (e.g. flash memory or other non-volatile memory) for signal processing at baseband level, an analog frontend circuit, and a LiFi interface circuit for connecting to the TRXs 11. The analog frontend circuit serves to provide a required driving capability for transmission signals after digital-to-analog conversion (DAC) and reception signal prior to analog-to-digital conversion (ADC). The LiFi interface circuit further converts the signal from the analog frontend circuit to a signal suitable for the LEDs and photodiodes of the TRXs 11.

Furthermore, each TRXs 11 may comprise a driver circuit and at least one radiation emitting element (e.g. LED or laser diode) for transmission of LiFi signals and a radiation detecting element (e.g. photo detector) and amplifier for reception of LiFi signals.

Additionally, the EP transceiver device 210 may comprise a USB interface circuit, a baseband unit, an analog frontend circuit, a transmission branch with a modulator circuit and a radiation transmitting element, and a reception branch with radiation detecting element and an amplifier. Alternatively, the EP transceiver device 210 may be integrated in an end-user device, such as a mobile phone, a tablet, or a laptop and provide optical wireless connectivity for such a device, thereby rendering the USB interface obsolete.

As already indicated above, data transmission between the modem 212 and the endpoint 10 may be based on time division multiple access (TDMA) and the used spectrum may range between e.g. 2 and 200 MHz, while an IR wavelength may be used for the optical transmission between the TRXs 11 and the EP transceiver device 210. Thereby, bitrates around 150 Mbps/dongle may be reached. Alternatively, other media access control schemes may be employed such as proposed for IEEE802.11bb.

In an example, a control software may be running on a central processing unit (CPU) provided in the modem 212 and the EP transceiver devices (e.g. dongles) 210, wherein the CPU may be part of the respective baseband units. The TRXs 11 may be implemented without a CPU.

According to various embodiments, a reversed approach for power supply is suggested, where the TRXs 11 act as power sourcing equipment (PSE) and the modem 212 acts as a powered device (PD). As an additional option, if the TRXs 11 are located in (or nearby) the luminaires, then the power supply (mains- or Power over Ethernet (PoE)-based) for the luminaires can be used for powering of the TRXs 11 as well. In an example, a light source driver (e.g. LED driver) of the luminaires may then be provided with an additional direct current (DC) auxiliary (AUX) output (e.g. 24 V, 3/6 W or SR 2.0). Although explained here with an example making use of PoE terminology, the invention may also be applied outside the context of PoE devices.

This reversed power supply provides simplified installation, reduced cable power loss, and enables preparation for future fiber-to-modem LiFi architecture (where LiFi signals are supplied to the modem via optical fiber connections).

According to various embodiments, a management channel (e.g. a low-bitrate narrow band (NB) channel) is provided between the EP transceiver device (e.g. dongle) 210 and the TRXs 11. In an example, the TRXs 11 may be configured to communicate via the management channel by using a reduced number of their respective radiation emitting elements (e.g. one instead of four LEDs), to thereby reduce power consumption of the TRXs 11 to the power consumption of one radiation emitting element. This transmission mode may be called "stand-by mode" or "NB mode", while the standard transmission mode may be called "high band (HB) mode". As the NB mode has lower bandwidth requirements than the HB mode, the NB mode may make use of a more robust Modulation and Coding Scheme (MCS) as found in optical wireless communication standards such as G.vlc and/or proposed for 802.11bb. As such modulation schemes are more robust, a lower optical transmit power generally suffices to still be able to transmit data from the transceiver to an endpoint at reduced speed. In practice the reduction in optical transmit power may be achieved by lowering the drive current of the LED/VCSELs or by using a lower number of emitters.

In an example, it is assumed that the power consumption of the modem 212 results from a basic consumption of 3 W (including a minimum number of one channel to the TRXs 11) plus a variable consumption of 0.4 W for the first active TRX and 1 W for each further active TRX. Furthermore, it is assumed that the power consumption of each TRX 11 results from a reduced consumption of 1.6 W (i.e. one active radiation emitting element) in the NB mode and a full consumption of 4.6 W (i.e. four active radiation emitting elements) in the HB mode. Based on these assumptions, the following different constellations and involved total amounts of power consumption of a power supply system with one modem 212 and six TRXs 11 can be identified based on the number of active TRXs (i.e. TRX activated via the management channel to establish a connection with an EP):

|  | Total power consumption of the system | Power consumption of the modem | Power consumption of the TRXs |
|---|---|---|---|
| No dongle detected | 12.6 W | 3 W (including first channel in NB mode) | 9.6 W (1.6 W*6) – all TRXs in NB mode |
| Dongle detected for one TRX | 16 W | 3.4 W (3 W + 0.4 W) first channel in HB mode | 12.6 W (1.6 W*5 + 4.6 W) – 5 TRXs in NB mode, 1 TRX in HB mode |
| 2 Dongles detected for two different TRXs | 20 W | 4.4 W (3.4 W + 1 W for second channel) | 15.6 W (1.6 W*4 + 4.6 W*2) – 4 TRXs NB, 2 TRXs HB |
| 3 Dongles detected for 3 different TRXs | 24 W | 5.4 W (4.4 W + 1 W for third channel) | 18.6 W (1.6*3 + 4.6 W*3) – 3 TRXs NB, 3 TRXs HB |
| 4 Dongles detected for 4 different TRXs | 28 W | 6.4 (5.4 W + 1 W for fourth channel) | 21.6 W (1.6*2 + 4.6 W*4) – 2TRXs NB, 4 TRXs HB |
| 5 Dongles detected for 5 different TRXs | 32 W | 7.4 (6.4 W + 1 W for fifth channel) | 24.6 W (1.6*1 + 4.6 W*5) – 1 TRXs NB, 5 TRXs HB) |
| 6 Dongles detected for 6 different TRXs | 36 W | 8.4 (7.4 W + 1 W for sixth channel) | 28.6 W (4.6 W*6) – 6 TRXs HB |

As can be gathered from the above example, by applying the proposed reverse power supply approach, the supplied power consumption can be adapted to the number of active TRXs and the total power does not have to be supplied to the modem 212 via its Ethernet connection (PoE) or a dedicated power supply circuit.

Figure 3:
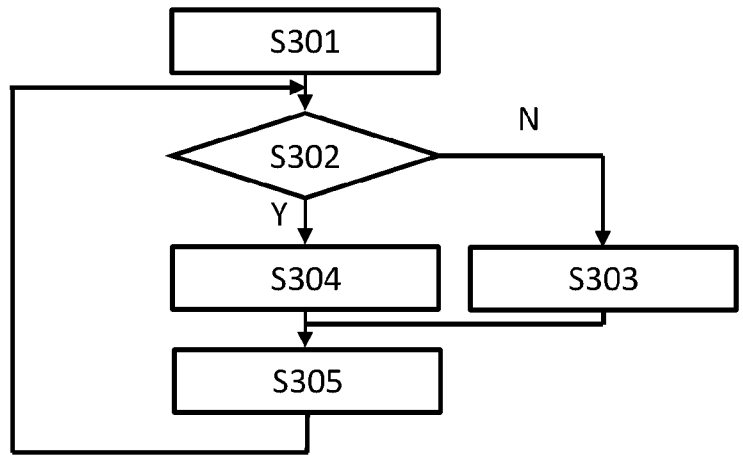
FIG. 3 shows a flow diagram of a power supply procedure.
Figure 4:
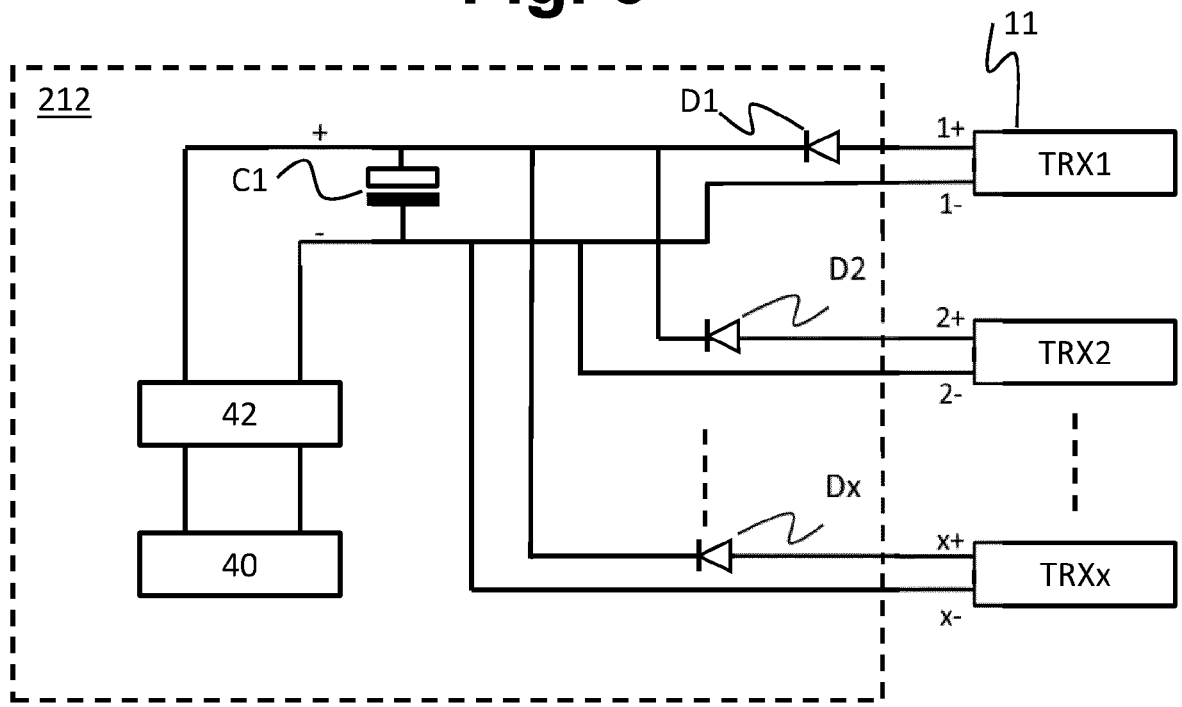
FIG. 4 shows schematically an exemplary circuit diagram of a modem with power multiplexing approach.

FIG. 3 shows a flow diagram of a power supply control procedure according to various embodiments. The procedure may be implemented by a software-controlled processing element (e.g. CPU) configured to control the TRXs 11 and their power supply connections to the modem 212 or based on a wired hardware solution (e.g. as shown in FIG. 4).

In step S301, power is directly supplied to the TRXs 11 via respective local power supplies of the TRXs 11 or their associated luminaires.

Then, in step S302, it is checked (e.g. based on information received via the management channel) whether a signal from an EP transceiver circuit (e.g. dongle or laptop) 210 has been detected. If not, the procedure branches to step S303 and all TRXs 11 of the modem 212 are set into the standby or NB mode to reduce their power consumption to the minimum value (e.g. one active radiation emission element). Then, the procedure continues with step S305.

Otherwise, if it is determined in step S302 that at least one EP transceiver circuit (e.g. dongle) 210 has been detected, the procedure continues with step S304 where the TRX(s) 11 of the detected EP transceiver circuit (e.g. dongle) 210 is/are set to the HB mode. Thereafter, the procedure continues with step S305 where the TRX with the highest available supply voltage is selected for supplying power to the modem 212. Then, the procedure jumps back to step S302 and continues to check whether an EP transceiver circuit (e.g. dongle) 210 has been detected.

As result, the modem 212 can be powered via the TRXs 11 and the amount and source of power suppled to the modem 212 is controlled based on the individual situation at the TRXs 11.

FIG. 4 shows schematically an exemplary circuit diagram of a modem with a wired power multiplexing approach according to various embodiments.

To combine power supply connections from several TRXs (TRX1 to TRXx) 11, a simple hardwired implementation is proposed, where diodes D1 to Dx or other electric valve elements are used for "power multiplexing" by providing a closed connection to the TRX with the highest supply voltage. In this way, the TRX(s) with highest voltage will supply power to the modem 212.

The PSU in the TRXs 11 may be a power limited source and will thus reduce its output voltage in case the load current (demanded by radiation emitting elements and modem 212) increases and more power is requested than can be supplied. Other channels (i.e. other TRXs) will then take over and supply current via their respective diodes to the load. As shown in FIG. 4, the power supply connections ("+" and "−") from the TRXs 11 are coupled to a common coupling point, which may be an electrolytic capacitor C1 or other energy storage element inside the modem 212.

The power supply to the TRXs 11 may be derived from an extension interface, of a co-located luminaire for example an extension interface customarily used for connecting sensors, a dedicated PSU in the co-located luminaire, or a power supply bus system (e.g. 48V supply bus). The extension interface may build on a Digital Addressable Lighting Interface (DALI) architecture, the so-called Sensor Ready or SR interface. In this situation it uses a digital interface to connect the TRXs 11 with an SR driver. The SR interface provides power to the TRXs 11 and allows for digital two-way communication based on the DALI protocol. By integrating power supplies for different functionalities inside luminaires, rather than outside, the SR interface simplifies luminaire design, manufacturing and installation. Moving to a wireless application means a field bus is no longer needed to link luminaires together using wires.

Since most of the power is consumed by the TRXs 11, the proposed reverse powering scheme saves cables losses and allows powering on a need-to-basis and is therefore more efficient than forward powering schemes where the TRXs 11 are powered via the modem 212.

Figure 5:
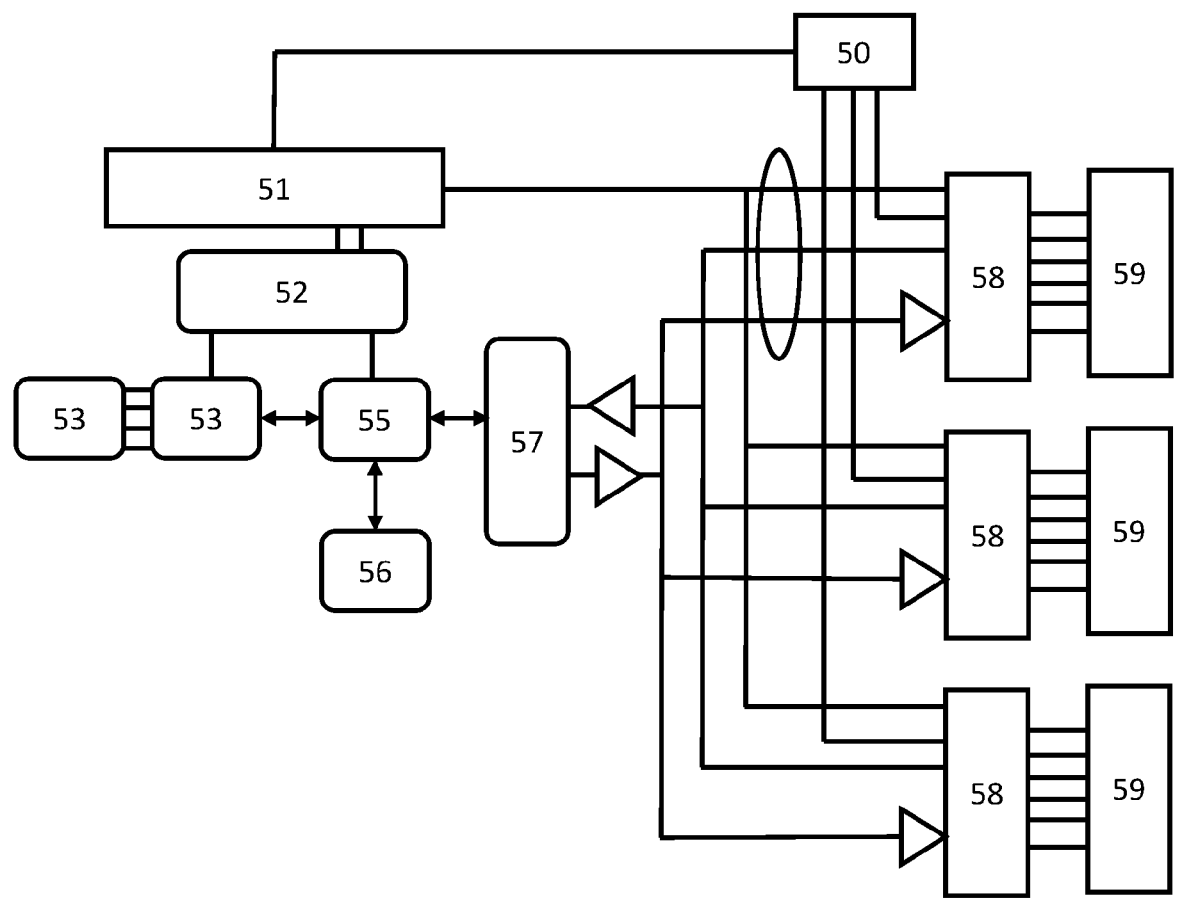
FIG. 5 shows schematically a block diagram of a modem for distributed power supply.
Figure 6:
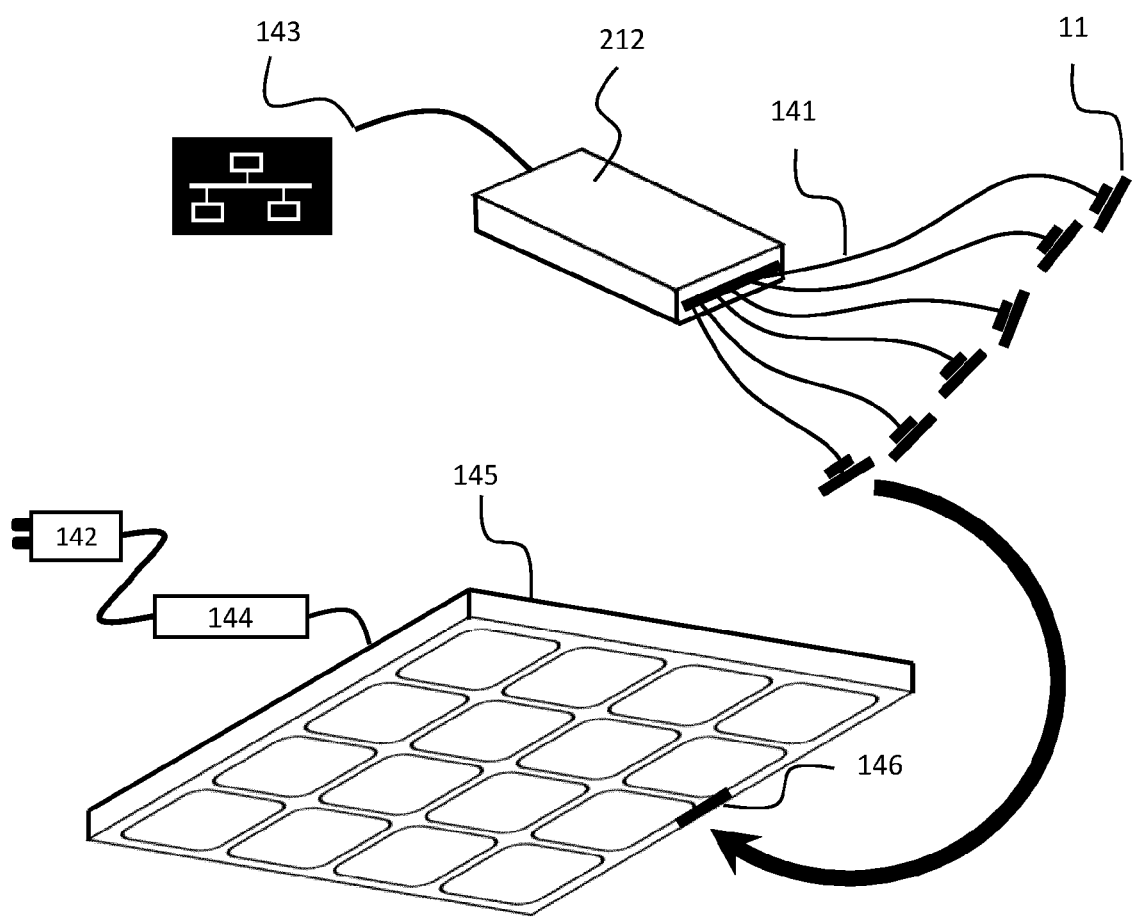
FIG. 6 shows schematically an exemplary implementation of a multi-transceiver access device with transmit branch combination according to various embodiments.

FIG. 5 shows schematically a block diagram of a modem (e.g. modem 212 in FIGS. 2 and 4) for distributed reverse power supply according to various embodiments. Here, the proposed reverse powering scheme is implemented in the modem. A common remote power equipment may be provided for all TRXs (not shown in FIG. 5) and the modem is powered via a power combiner 50 connected via connection lines (e.g. copper pairs or other connection pairs) to respective TRX connectors 59 via respective transformers 58 (which may include common mode chokes for decreasing common mode noise). The TRX connectors 59 allow that the TRXs can be releasably connected to the modem via respective cables, as shown in the example of FIG. 6). Each of the TRXs may have a PSU connected thereto, wherein each PSU is configured to be capable of powering a TRX and the modem. As an alternative, the TRXs may be co-located at luminaires of the LiFi system and may use the PSU(s) of the luminaires for their power supply.

The modem may be located together with associated luminaires of a LiFi system in the ceiling of building and is powered from the TRXs via the power combiner 50 which may be configured to operate based on the procedure of FIG. 3 or the hardwired implementation of FIG. 4. More specifically, AC power may be supplied by the power combiner 50 to an input of an AC/DC power supply 51 which supplies power to a power management unit 52 responsible for power distribution to a Ethernet physical layer network processing unit 54 that provides connectivity to a network system (e.g. Ethernet) via a respective interface 53. Furthermore, the power management unit 52 supplies power to a baseband circuit 55 with a memory 56 for baseband signal processing of LiFi signals and for supplying baseband signals to an analog frontend 57 configured to transmit and receive LiFi signals to/from the plurality of TRXs via the respective transformers 58 and connectors 59.

The TRXs (not shown) may be inserted into extension slots of luminaires and may comprise a plurality (e.g. 4) of radiation emitting elements (e.g. LEDs) for transmitting a high-bitrate LiFi signal. The TRXs are configured to reduce their power consumption by using only a subset of their radiation emitting elements (emitters) when no EP transceiver device (e.g. dongle) is detected, at which case the modem can also be switched to a lower power mode. This can be achieved by respective feedback connection from the connectors 59 via the transformers 58 to the AC/DC power supply 51 of the modem.

As explained in connection with FIGS. 3 and 4, power supply from the TRXs can be controlled by the power combiner 50 in a time sequential manner, so that the duration of power supply is spread over all TRXs.

Thus, power supplied to the TRXs from a local power source (which may be located within an associated luminaire) is used to power not only the electronics inside the TRXs, but also to power the modem remotely. Apart from wires to transmit and receive data between the TRXs and the modem, there is an additional pair of connection lines (e.g. copper pair) available, which can be used for the power transfer to the modem (in the opposite direction) via the power combiner 50.

Thus, at least one of the TRXs is responsible for powering of common circuitry contained within the modem (e.g. network processing unit 54, baseband unit 55, analog frontend 55 etc.).

As explained above, power sharing can be done in the time domain by enabling power from at least one selective active TRX at a time in sequential order by the power combiner 50. The duration for which power is derived from an active TRX will depend upon the amount of EP transceiver devices (e.g. dongles) connected via a wireless optical LiFi connection link to the particular TRX. There may be occasions where only a single TRX is active and provides power to the remote modem. Hence, it is important to design the local power supply (e.g. in the luminaire) with sufficient power capability, keeping in mind losses that will occur along the power supply connection lines.

FIG. 6 shows schematically an exemplary implementation of a multi-transceiver access device with transmit branch combination according to various embodiments.

In the exemplary implementation of FIG. 6, a LiFi modem 212 is connected via a network cable 143 to a communication network (e.g. a local area network (LAN, Ethernet) or the like). The modem 212 comprises a power combiner (not shown) for remote reverse power supply via at least one of six TRXs 11 as explained in the above embodiments. Furthermore, the modem 212 generates six output signals supplied via respective cables 141 to the six TRXs 11 (e.g. infrared (IR) transceivers) with integrated plugs or interfaces that can be connected to a corresponding sockets 146 provided at respective ceiling units (panels) 145 which comprises one or more luminaires for optical transmission of the output signal generated by a respective TRX 11. The ceiling unit 145 is driven by a driver circuit 144 (e.g. an LED driver) which is connected via another plug 142 to the mains power grid. The driver circuit 144 may thus act as the PSU that supplies power to the respective TRX 11 and the modem 212.

In this manner the optical wireless TRX units are integrated in the ceiling units and do not require separate transmitter units. Alternatively, e.g. in the event the spacing of the illumination ceiling units is too far apart to provide proper coverage by means of TRXs integrated in ceiling units, a TRX could be mounted in a separate "standalone" unit (not shown).

It is however noted that the suggested power combiner does not need to be integrated inside the modem. It may be provided as a separate device that can be connected between the TRXs and the modem, e.g., a plug-in module or the like.

To summarize, a power supply system for an optical wireless communication system has been described, wherein a modem is connected to a plurality of transceivers. The underlying idea being that the transceivers are powering the modem, rather than the modem powering the transceivers. To achieve this, a power combiner is provided that can receive power from the transceivers. The transceivers power down when no endpoint is detected and use a subset of emitters, at which case the modem can also be switched to a lower power mode.

While the invention has been illustrated and described in detail in the drawings and foregoing description, such illustration and description are to be considered illustrative or exemplary and not restrictive. The invention is not limited to the disclosed embodiments. The proposed reverse power supply concept can be applied to other types of optical wireless networks and with other types of access devices, modems and transceivers. In particular, the invention is not limited to LiFi-related environments, such as the ITU-T G.9961, ITU-T G.9960, and ITU-T G.9991 network environment. It can be used in visible light communication (VLC) systems, IR data transmission systems, G.vlc systems, OFDM-based systems, connected lighting systems, OWC systems, and smart lighting systems.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described procedures like those indicated in FIG. 3 can be implemented as program code means of a computer program and/or as dedicated hardware of the receiver devices or transceiver devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An optical wireless communication system comprising:
   a modem for generating output signals for a plurality of optical transceivers in the optical wireless communication system;
   the plurality of optical transceivers each comprising an optical emitter and a light sensor for optical communication towards end points, wherein the optical emitter is configured to emit an optical signal based on the output signal of the modem; and
   at least one power sourcing equipment capable of powering at least one of the plurality of optical transceivers and the modem wherein the modem comprises:
   a power supply unit of the modem configured to supply power to the modem; and
   an apparatus for controlling power supply to a modem connected to the plurality of transceivers in the optical wireless communication system, the apparatus being configured to select at least one of the transceivers for reverse power supply to the modem and to establish a power supply connection between the selected transceiver and the power supply unit of the modem.

2. The optical wireless communication system of claim 1, wherein the apparatus is configured to select a transceiver with the highest available supply voltage among the plurality of transceivers for reverse power supply to the modem.

3. The optical wireless communication system of claim 1, wherein the apparatus is configured to combine power supply connections from the plurality of transceivers via at least one respective valve element D1-Dx) at a common coupling element (C1).

4. The optical wireless communication system of claim 1, wherein the apparatus is configured to set a transceiver into a standby mode with reduced power consumption, if the transceiver has not detected any signal from a transceiver circuit of an endpoint of the optical wireless communication system.

5. The optical wireless communication system of claim 1, wherein the apparatus is configured to supply power to the modem in a time sequential manner, so that a duration of power supply is spread over the plurality of transceivers.

6. The optical wireless communication system of claim 1, wherein the apparatus is configured to be connectable as a separate device between the modem and the plurality of transceivers.

7. The optical wireless communication system of claim 1, wherein the plurality of transceivers are powered by one or more power sourcing equipment.

8. The optical wireless communication system of claim 1, wherein the modem is configured to be installed at a ceiling of a building in which the optical wireless communication system is used.

9. The optical wireless communication system of claim 1, wherein the modem comprises a power combiner configured to receive power from the plurality of transceivers via respective wired power supply connections.

10. The optical wireless communication system of claim 1, wherein the at least one power sourcing equipment is configured to supply power to at least one luminaire.

11. The optical wireless communication system of claim 10, wherein the plurality of transceivers are co-located with respective luminaires powered by the at least one power sourcing equipment.

12. The optical wireless communication system of claim 11, wherein each of the co-located luminaire and transceiver pairs are powered by a dedicated power sourcing equipment.

13. The optical wireless communication system of claim 1, wherein the plurality of transceivers are configured to reduce their power consumption by using a subset of emitters when no signal from a transceiver device of an endpoint is detected.

14. The optical wireless communication system of claim 13, wherein a management channel is provided between a transceiver device of an endpoint and the plurality of transceivers, and wherein the transceivers are configured to communicate via the management channel by using a reduced number of emitters.

* * * * *